United States Patent [19]

Di Orio

[11] Patent Number: 4,761,736

[45] Date of Patent: Aug. 2, 1988

[54] MEMORY MANAGEMENT UNIT FOR ADDRESSING AN EXPANDED MEMORY IN GROUPS OF NON-CONTIGUOUS BLOCKS

[75] Inventor: David W. Di Orio, West Chester, Pa.

[73] Assignee: Commodore Business Machines, Inc., West Chester, Pa.

[21] Appl. No.: 815,695

[22] Filed: Jan. 2, 1986

[51] Int. Cl.[4] .............................................. G06F 12/06
[52] U.S. Cl. .................................................... 364/200
[58] Field of Search ... 364/200 MS File, 900 MS File

[56] References Cited

U.S. PATENT DOCUMENTS

| 3,970,999 | 7/1976 | Elward | 364/200 |
|---|---|---|---|
| 4,340,932 | 7/1982 | Bakula et al. | 364/200 |
| 4,403,283 | 9/1983 | Myntti et al. | 364/200 |
| 4,443,847 | 4/1984 | Bradley et al. | 364/200 |
| 4,481,570 | 11/1984 | Wiker | 364/200 |
| 4,511,964 | 4/1985 | Georg et al. | 364/200 |
| 4,519,032 | 5/1985 | Mendell | 364/200 |
| 4,613,953 | 9/1986 | Bush et al. | 364/900 |

Primary Examiner—Raulfe B. Zache
Assistant Examiner—Florin Munteanu
Attorney, Agent, or Firm—John J. Simkanich

[57] ABSTRACT

A n-channel memory management circuit operates as an interface unit between a microprocessor, which microprocessor is normally capable of addressing only 64K bytes of memory, to provide expandable memory configurations with a memory capacity of at least 128K bytes of read only memory (ROM) and 128K bytes of random access memory (RAM) which are directly accessed by the microprocessor in 64K bytes blocks or "windows" consisting of smaller size non-contiguous blocks from the entire memory configuration.

12 Claims, 3 Drawing Sheets

MEMORY MANAGEMENT UNIT FOR ADDRESSING AN EXPANDED MEMORY IN GROUPS OF NON-CONTIGUOUS BLOCKS

BACKGROUND OF THE INVENTION

The invention relates to translator circuits for accessing expanded memory locations in read only memory (ROM) and dynamic random access memory (RAM) from microprocessors originally designed to access limited electronic memory.

Many personal computers have been built around microprocessors such as Commodore-MOS Technology model 6502 or Zilog Corporation model Z80. These microprocessors are 8-bit devices whose internal architecture is set up to access 64K bytes of electronic memory, either RAM or ROM. These microprocessors are both reliable and inexpensive to incorporate into any computing or controller system. A limitation, however, in their use in the past has been that expanded memory, when used with these microprocessors, has had to be magnetic medium, such as magnetic tape or disk or the like. The writing and reading of data from such peripheral storage has always been slow.

Recent advances in manufacturing techniques has allowed the cost of electronic memory (RAM and ROM) to drop dramatically thereby making it desirable to incorporate large amounts of electronic memory into personal computers.

One drawback to incorporating large amounts of electronic memory into systems utilizing older design 8-bit microprocessors has been these microprocessors' capabilities to direct access 64K of electronic memory.

It is desirable to provide a memory management unit, as a high speed interface, between large amounts of electronic memory (ROM and RAM) and the 6502 and Z80 microprocessors or similar microprocessor units, whereby these microprocessors' ability to address only 64K of electronic memory is increased to plural units of 64K electronic memory. It is also desirable that such memory management unit operate in dual microprocessor systems.

SUMMARY OF THE INVENTION

An object of the present invention is to provide a memory management unit circuit as a programmable controller or translator circuit which accesses large amounts of electronic memory (RAM and ROM) in 64K units or "windows" from microprocessor memory addresses.

A second object is to provide this circuit for use in either single or plural (i.e. dual) microprocessor systems whereby the circuit is compatible with the NMOS (N-type metal oxide semiconductor) LSI (large scale integrated) circuit implementation of the host system.

A further object is to provide this circuit with the ability to access the 64K memory window from units of 16K memory selected from between any of a plurality of RAM and ROM chips.

An additional object is to select between memory size for 40 column and 80 column video display.

The objects of the present invention are incorporated in a circuit implemented in NMOS, LSI circuitry on a 48 pin DIP (dual in line pin) chip wherein the operating status of the circuit is switched between predetermined operating states (functions) by program instructions loaded into registers, whereby these instructions operate functionally as switches for circuit operation selection.

A dual microprocessor system includes an 8-bit 6502 type microprocessor (or a similar Commodore-MOS Technology 8502 microprocessor) and an 8-bit Z80 microprocessor. A 16-bit address bus is common to both microprocessors and an 8-bit data bus is likewise common to both microprocessors. A buffer circuit is used to interface the data bus to the Z80 microprocessor as the 8502 microprocessor is allowed to operate at a slower speed from the Z80.

A plurality of dynamic random access memory (RAM) units are available in 64K RAM chips. A plurality of read only memory (ROM) units are available in 128K ROM chips.

Memory addresses are received from either the 8502 or the Z80 via the address bus and translated into an expanded memory address which enables selected memory locations on the RAM chips to be available to the data bus during a particular processing cycle. Z80 and 8502 access on the data bus is controlled.

The expanded memory address is used to generate or control instruction which is input into a programmable logic array circuit (PLA). This PLA is implemented as a decoder circuit whose output is an exclusive control signal on one of a plurality of dedicated control lines to the 128K ROM chips. This decoder circuit output selects one of the ROM chips to be available to the data bus during a particular processing cycle.

DESCRIPTION OF THE DRAWINGS

The structural features, operation and advantages of the present invention will be better understood from a reading of the following detailed description with the accompanying drawings in which like numerals refer to like elements, and in which.

DETAILED DESCRIPTION OF THE INVENTION

Figure 1:
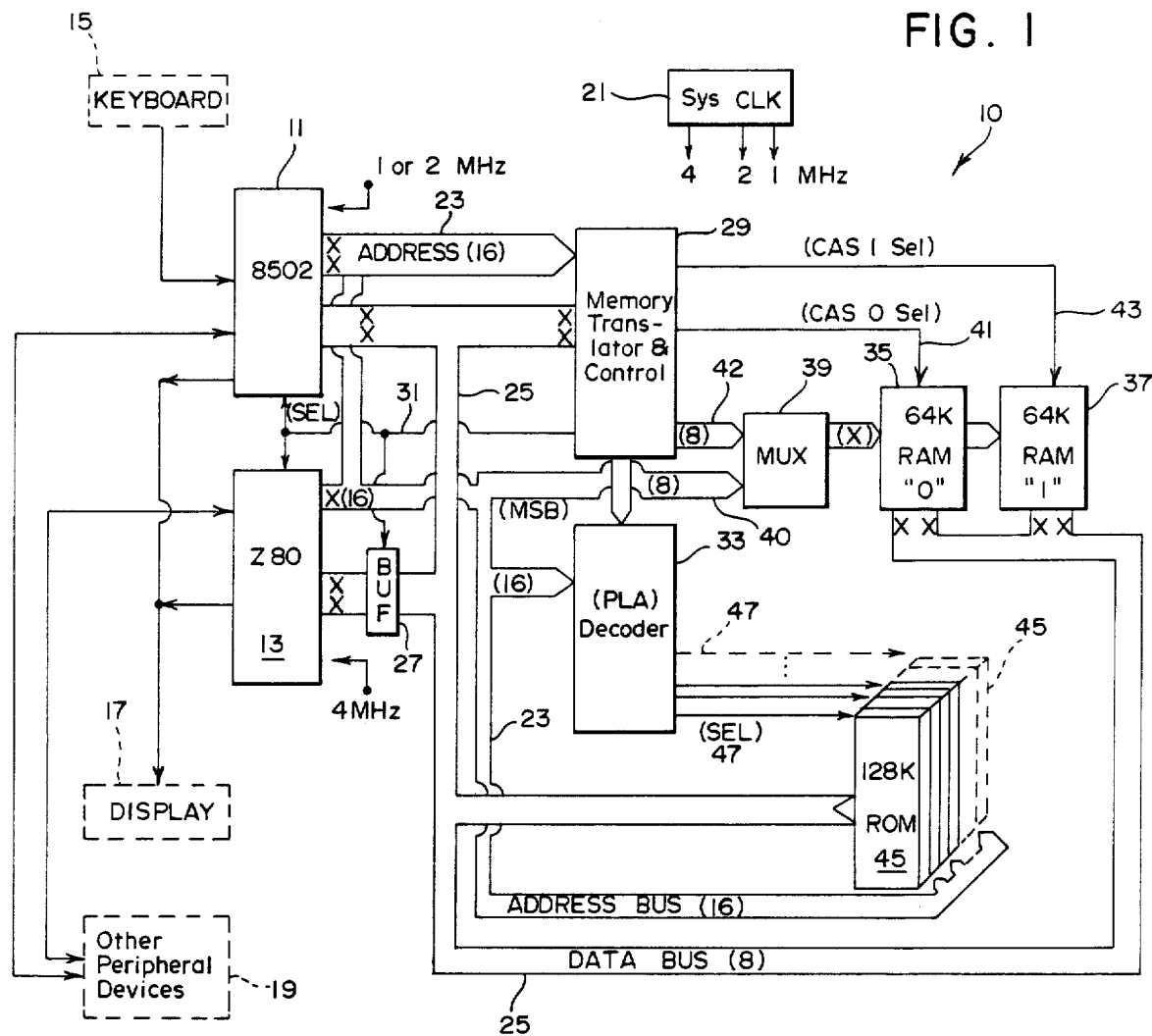
FIG. 1 is a circuit block diagram of a dual microprocessor system utilizing expanded electronic memory accessing in 64K memory units per processing cycle.

A personal computer system 10, FIG. 1, has dual microprocessors, a Commodore-MOS Technology model 8502 microprocessor 11, and a Zilog Corporation model Z80 microprocessor 13. A keyboard 15 is connected to provide operator data and instructions to the 8502 microprocessor 11. A video/audio display 17 is connected to the Z80 microprocessor 13 or the 8502 microprocessor 11 while other peripheral devices 19, including floppy disk and paddles, are connected to both microprocessors 11, 13. An oscillator, being the system clock 21, provides 4, 2 and 1 MHz pulses, where the Z80 microprocessor 13 is operated at the 4 MHz rate and the 8502 microprocessor 11 is operated at the 2 or 1 MHz rate.

A 16-bit address bus 23 is connected to each of the 8502 and Z80 microprocessors 11, 13 for bi-directional transmission of addresses. An 8-bit data bus 25 is connected directly to the 8502 microprocessor 11 and to the Z80 microprocessor 13 through a data buffer 27 for bi-directional transmission of data.

A memory translator and control circuit 29 is connected to the data bus 25, and provides a (Z80 enable) select signal on line 31 to the Z80 microprocessor 13, its data buffer 27 and the 8502 microprocessor 11 to select between microprocessors 11 and 13 being on the system data bus 25. When the select signal is "high," the Z80 microprocessor 13 is on and the 8502 microprocessor 11 is off the data bus 25.

The memory translator and control circuit 29 is also connected to the address bus 25. A program logic array (PLA) decoder circuit 33 is connected to the address bus 23 and to the memory translator and control circuit 29.

A first and second 64K dynamic random access memories (RAM) 35, 37 are each connected to the memory translator and control circuit through a multiplexer/circuit 39. The multiplexer 39 receives the 8 least significant bits 40 from the address bus 23 and 8-bit words 42 from the memory translator and control circuit 29 and transmits same to each RAM 35, 37 as 8-bit addresses.

An exclusive column address strobe (CAS) select signals 41, 43 is generated by the memory translator and control circuit 29 and connected to the RAMs 35, 37 with the CAS-0 signal 41 enabling the first RAM 35 and the CAS-1 signal 43 enabling the second RAM 37. Each of the RAMs 35, 37 is connected for bi-directional transmission with the data bus 25.

A plurality of 128K read only memories (ROM) 45 are each connected to place data on the data bus 25 when enabled by an exclusive select signal 47 from the decoder 33. Each ROM 45 is connected to the address bus 23. For the system 10, shown in FIG. 1, there are seven ROM's 45 and the decoder 33 has seven select (ROM) control lines 47. This number of ROM memories can be varied from system to system with obvious design variations in the decoder 33 to provide additional select outputs.

Figure 2:
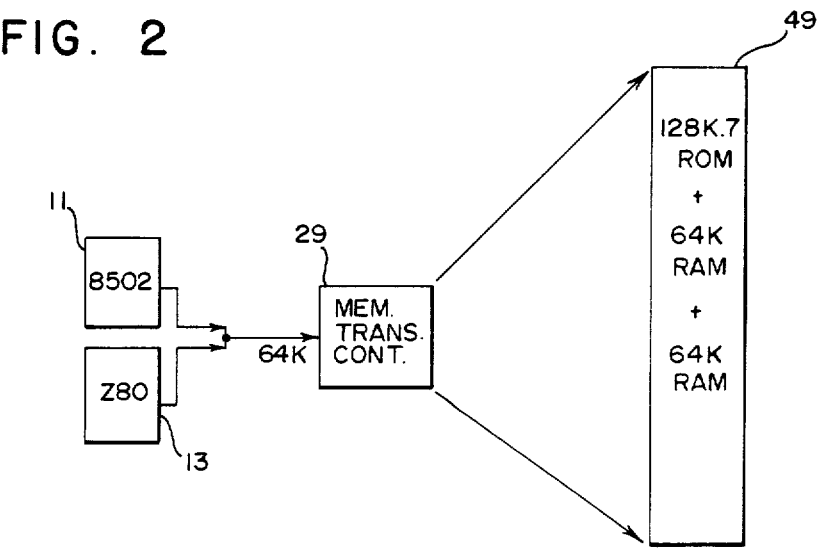
FIG. 2 is a functional operation diagram for the memory location translator component of the circuit of FIG. 1.

The 8502 and Z80 microprocessors 11, 13 can conceptually be seen to address large amounts of electronic memory 49, either RAM or ROM or both, through the memory translator and control circuit 29, as functionally represented by FIG. 2. As both microprocessors 11, 13 can only address 64K of memory in any processing cycle, the memory translator and control circuit 29 must translate the large amounts of memory 49 provided in the system into 64K "units". Moreover, these 64K units of memory are made up into 16K non-contiguous blocks of memory from amongst the total electronic memory available 49.

A "real" memory 49 address is made up of the 8 least significant bits 40 from an address provided by either the 8502 or the Z80 microprocessors 11, 13 and 8 bits of address generated by the memory translator circuit 29 from data provided from the microprocessors 11, 13.

Figure 3:
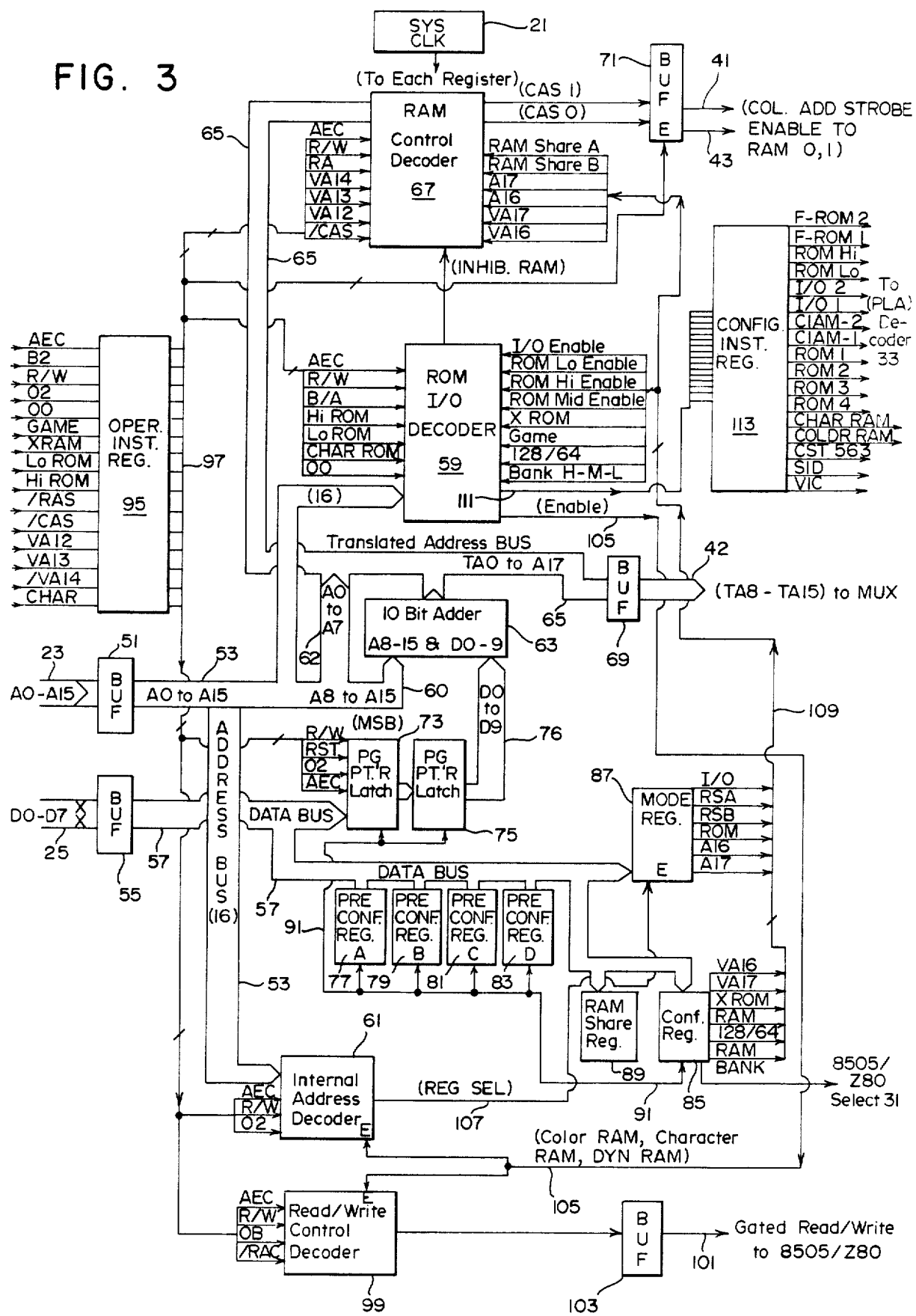
FIG. 3 is a circuit block diagram of the memory location translator component of the circuit of FIG. 1.

The memory translator and control circuit 29 is shown in greater detail in FIG. 3. This circuit 29 is made as an NMOS, LSI circuit component on a single 48 pin (DIP) chip.

Address bus 23 is connected to an address buffer 51. A chip-internal 16-bit address bus 53 is connected to lead from this address buffer 51. Data bus 25 is connected to a data buffer 55. A chip-internal 8-bit data bus 57 is connected for bi-directional data transmission with this data buffer 55.

Address bus 53 is connected to a ROM I/O decoder 59 and an internal address decoder 61. The eight most significant bits (A8 to A15) 60 of the address bus 53 are connected to feed into a 10-bit adder circuit 63, output of which is connected to feed onto a translated address bus 65. This translated address bus 65 is connected to a RAM control decoder 67 and to an output buffer 69, where output buffer 69 provides eight translated bits 42 to the multiplexer 39 of FIG. 1.

RAM control decoder 67 has as outputs the CAS-0 select signal 41 and the CAS-1 select signal 43 which are sent to the RAMs 35, 37 of FIG. 1, via a second output buffer 71.

Data bus 57 is connected to feed 8-bit data to a first page pointer latch register 73 (slave latch).

This latch register 73 is connected to transfer its contents to a second page pointer latch register 75 (master latch). The output from the second latch register 75 is ten bits of data 76 which is fed into the 10-bit adder 63. The output from the 10-bit adder 63 is fed onto the translated address bus 65.

The data bus 57 is also connected to feed 8-bit data to a first preconfiguration register-A 77; a second preconfiguration register-B 79; a third preconfiguration register-C 81; a fourth preconfiguration register-D 83; a configuration register 85; a mode register 87; and a RAM share register 89.

A 17-bit operation instruction register 95 is loaded with instruction code from the microprocessors 11, 13 via the system address and data buses 23, 25 via selected line connections.

Operation instruction register 95 is connected to first instruction control bus 97 which has certain of its control lines connected to the RAM control decoder 67; to the RAM I/O decoder 59; to the enable/transfer input to the second output buffer 71; to the first page pointer latch register 73; to the internal address decoder 61; and to a read/write decoder circuit 99. The identity of these control lines and the functions carried thereon will be discussed below.

The output from the read/write control decoder is a gated read/write signal 101 which is sent to the microprocessors 11, 13 through a third output buffer 103.

The operation of both the internal address decoder 61 and the read/write decoder 99 is simultaneously enabled or clocked by a single control line 105 as an output from the RAM I/O decoder 59. This control line 105 signal is present during display color, display characters and RAM selection definition operations.

The output from the internal address decoder 61 is a register select control signal (bus) 107 which is connected to enable or clock the operation of the configuration register 85.

The output from the RAM share register 89 and the mode register 87 and the configuration register 85 are connected into a second instruction control bus 109 which has certain of its control lines connected to the RAM control decoder 67; and to the ROM I/O decoder 59 as will be further identified by signal name below.

A third instruction control bus 111 carries seventeen instruction bits output by the ROM I/O decoder 59 to a configuration instruction register 113. The output from the configuration instruction register is connected into the PLA decoder 33 of FIG. 1.

Figure 4:
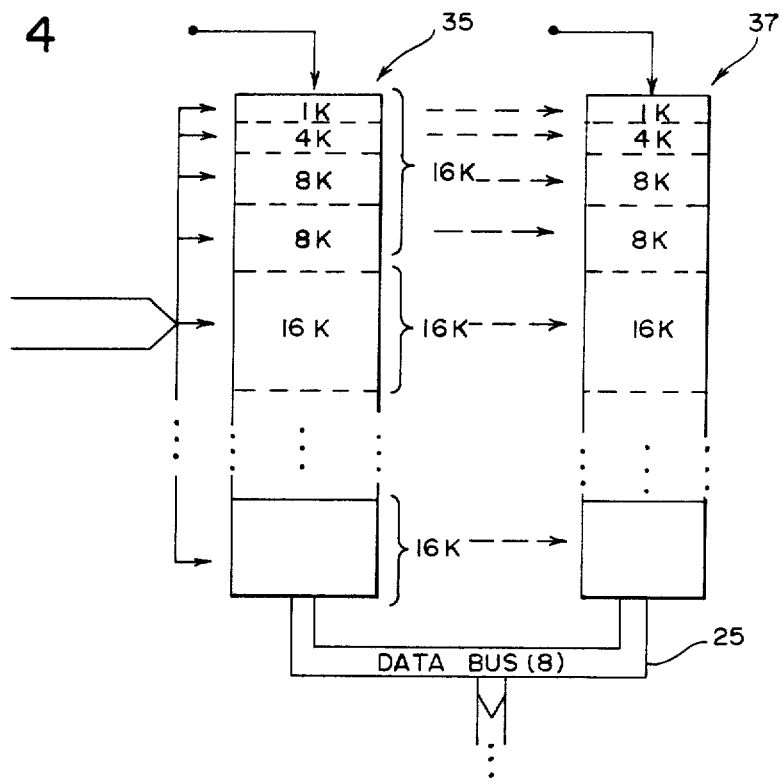
FIG. 4 is an illustration of RAMS 35 and 37 of FIG. 1.

A functional operation diagram for memory location accessing is shown in FIG. 4. The two RAMs 35, 37 are shown in FIG. 4 to be registerably addressable in variable-sized predetermined blocks of RAM memory as fixed and predetermined units of 1K, 4K, 8K or 16K bytes according to the instruction code illustrated, which code switches "blocks" to be read.

The first RAM 35 is normally read by the system unless the CAS-1 select 43 is activated, in which case the particular "block" of RAM 35 is "looked-through" and the corresponding physical location in the second RAM 37 is read instead. This process works equally well for write operations.

Figure 5:
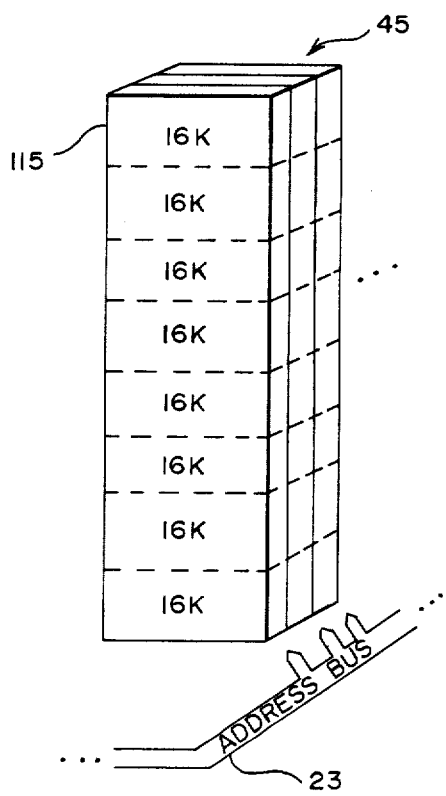
FIG. 5 is an illustration of ROM 45 of FIG. 1.

The ROMs 45 are represented in FIG. 5. While the graphic representation of FIG. 5 shows only three 128K ROMs 45 from FIG. 1 in "partial", seven of these ROMs 45 were discussed above in connection with the circuit of FIG. 1.

While each ROM 45 is 128K of memory, it can be addressed in 16K "blocks" as units, with the use of ROM "Mid" and ROM "Lo" instructions. A ROM "Hi" instruction will likewise address a 16K block 115, where in this case, the 1K, 4K, 8K and 16K bytes block instructions for accessing fixed sections of RAM also access like sized sections.

The memory translator and control circuit 29 operates with 17 different control signals shown labeled on FIG. 3 and identified as follows with their program instruction.

| | | |
|---|---|---|
| $FF04 | LCRD | LOAD CONFIGURATION REG D |
| $FF03 | LCRC | LOAD CONFIGURATION REG C |
| $FF02 | LCRB | LOAD CONFIGURATION REG B |
| $FF01 | LCRA | LOAD CONFIGURATION REG A |
| $FF00 | LC | CONFIGURATION REGISTER |
| $D50B | VR | VERSION REGISTER |
| $D50A | P1H | PAGE 1 POINTER HIGH |
| $D509 | P1L | PAGE 1 POINTER LOW |
| $D508 | P0H | PAGE 0 POINTER HIGH |
| $D507 | P0L | PAGE 0 POINTER LOW |
| $D506 | RCR | RAM CONFIGURATION REGISTER |
| $D505 | MCR | MODE CONFIGURATION REGISTER |
| $D504 | PCRD | PRECONFIGURATION REGISTER D |
| $D503 | PCRC | PRECONFIGURATION REGISTER C |
| $D502 | PCRB | PRECONFIGURATION REGISTER B |
| $D501 | PCRA· | PRECONFIGURATION REGISTER A |
| $D500 | CR | CONFIGURATION REGISTER |

The four preconfiguration registers (A, B, C, D) 77, 79, 81, 83 are utilized as buffer registers for the configuration register 85. Data is loaded from one of the preconfiguration registers 77, 79, 81, 83 in the the presence of an enable instruction 91 from that register to the configuration register 85.

The memory translator and control circuit 29 is an 8-bit circuit where all registers, buses and latches are eight bits wide.

The input signals to the circuit 29 of FIG. 3 are identified as follows:

| | |
|---|---|
| A0-A3, A8-A | Address Lines In |
| A4/5, A6/7 | Combined Address Lines In |
| D0-D7 | Data Lines In/Out |
| TA8-TA15 | Translated Address Lines Out |
| Vcc | +5V |
| GND | Ground |
| PHI0 | 2 MHz 0 Clock In |
| RESET | System Reset In |
| R/W | Read/Write Line In |
| /CAS0-/CAS1 | DRAM CAS, 64K Bank Out |
| AEC | Address Enable Control In |
| /Z80EN | Z-80 Enable Out |
| /GAME | GAME ROM Enable In, Control Out |
| /EXROM | External ROM Enable In, Control Out |
| MS0, MS1 | Memory Status Out |
| I/O SEL/ | I/O Select Out |
| C128/64 | C128 or C64 Mode Out |

-continued

| | |
|---|---|
| SENSE40 | 40/80 Status In, Control Out |
| FSDIR | Fast Serial ENB In, DIR Out |
| MUX | Memory Multiplex In |

Changes can be made in the above-described invention without departing from the intent and scope thereof. The above description is therefore to be interpreted as illustrative of the invention, and is not intended to limit the invention to the embodiment(s) thereof.

I claim:

1. A personal computer having connections thereto for connecting to an operator keyboard, a display device and other peripheral devices including a floppy disk, having a memory management structure for addressing all of expanded amounts of memory in real time by a single microprocessor whose capability is for addressing less than all of said memory, said computer comprising:

an 8-bit microprocessor having internal controls for accessing, real time, only 64K of electronic memory, said microprocessor having address bus and data bus connections;

an address bus connected to said microprocessor address bus connection;

a data bus connected to said microprocessor data bus connection;

at least two 64K RAMs connected to said data bus each said 64K RAM having its memory space addressed in blocks of memory of less than the total 64K;

a memory translator and control circuit connected on its input to said address bus and to said data bus having an output and providing on its output an exclusive control signal to enable only one of said 64K RAMs at a time to be read, said translator and control circuit providing a translated address signal on its output; and a multiplexer connected to said translator and control circuit output for receiving said translated address signal and connected to said address bus, the output of said multiplexer being connected to each of said 64K RAMs to address simultaneously each of said 64K RAMs;

wherein said 64K of electronics memory appears to said microprocessor as 64K of RAM comprised of combinations of blocks from both said at least two 64K RAMs.

2. The computer of claim 1 wherein said data bus is 8 bits wide and said address bus is 16 bits wide, and wherein said translated address output is 8 bits wide and said address bus connection to said multiplexer provides the 8 least significant bits from said bus to said multiplexer.

3. The computer of claim 2 also including at least two 128K ROMs each said ROM being connected to said address bus and being connected to said data bus; a decoder having a plurality of exclusive enable outputs, each one to enable access to only one of said ROMs, said decoder being connected to said address bus and to said memory translator and control circuit.

4. The computer of claim 3 also including a second 8-bit microprocessor, said second microprocessor having internal controls for accessing, real time, only 64K of electronic memory, and having an address bus connection to said address bus and a data bus connection to said data bus.

5. The computer of claim 4 wherein said first microprocessor and said second microprocessor are each allowed exclusive access to said address bus and said data bus under a control signal connected from said memory translator and control circuit; wherein 64K of memory appears to both said first microprocessor and to said second microprocessor from combinations of blocks of total RAM and ROM memory.

6. The computer of claim 5 wherein said blocks are in 16K bytes increments.

7. The computer of claim 6 wherein said total 64K can be assembled of combinations of predetermined blocks of 1K, 4K, 8K and 16K bytes of memory.

8. In a personal computer system having keyboard, display and floppy disk connections, a microprocessor capable of accessing only 64K bytes of electronic memory, an address bus connected to said microprocessor and a data bus connected to said microprocessor, the improvement comprising:
 a plurality of electronic memory units connected to said data bus, said memory units totaling more than 64K bytes and each unit addressable in plural memory blocks of less than the total memory capacity of the unit; and
 a memory translator and control circuit connected to said electronic memory units, said address bus and said data bus, said memory translator and control circuit operating on addresses and data received from said microprocessor to generate a translated memory address signal to said electronic memory units whereby a composite of blocks of memory totaling 64K bytes from said electronic memory units is presented to said microprocessor at each microprocessor processing cycle.

9. The system of claim 8 wherein said system also includes a second microprocessor connected to said address bus and to said data bus and wherein said plurality of electronic memory units include a plurality of 64K RAM chips connected to said data bus and a plurality of 128K ROM chips connected to said address bus and said data bus.

10. The system of claim 9 also including a multiplexor connected to said plurality of 64K RAM chips, wherein said translator and control circuit is connected to each of said RAM chips and operates to enable operation of one of said RAM chips at a time; wherein said RAM chips are addressed by a translated address signal from said memory translator and control circuit, this signal being a multiplexed composite of two components, the translated address signal generated by said memory translator and control circuit and the least significant bits portion signal from said address bus, each of said two components being connected to be passed through said multiplexer to said RAM chips; and also including an array decoder connected to said address bus and to receive an instruction from said translator and control circuit, said array decoder having a plurality of output select lines connected one each to each ROM chip to enable one said ROM chips during a microprocessor processing cycle.

11. The system of claim 10 wherein said memory translator and control circuit includes:
 an operation instruction register connected to said address bus and said data bus;
 a first buffer connected to said address bus;
 a second buffer connected to said data bus;
 an internal address bus connected to said first buffer;
 an internal data bus connected to said second buffer;
 a RAM control decoder connected to said internal address bus and said operation instruction register, said RAM control decoder providing selection control lines to said plural 64K RAM chips;
 a ROM I/O decoder connected to said internal address bus and to said operation instruction register;
 a configuration instruction register connected to said ROM I/O decoder, said configuration instruction register output being connected to said array decoder;
 a page pointer latch register connected to said internal data bus and said operation instruction register;
 an adder receiving as a first input a most significant bit portion of said internal address bus and as a second input the contents of said latch register an adder output and a least significant bit portion of said internal address bus being connected to a translated address bus said translated address bus being connected to said multiplexer and to said RAM control decoder.

12. A memory translator and control circuit for a personal computer system, said system having an address bus and having a data bus, a plurality of RAM chips connected to said data bus, an array of ROM chips connected to both said address bus and to said data bus, an array decoder connected to both said address bus and to said ROM chips and two microprocessors each connected to both said address bus and to said data bus, each microprocessor being capable of accessing only 64K of memory, wherein said memory translator and control circuit presents 64K of said RAM and ROM memory to said data bus as a selected composite of blocks of memory from each, for each microprocessor processing cycle, comprising:
 an input operation instruction register;
 an address buffer;
 a data buffer;
 an internal address bus connected to said address buffer;
 a RAM control decoder connected to said instruction register, said RAM control decoder having RAM enable select signals as an output therefrom:
 a ROM I/O decoder connected to said internal address bus and to said operation instruction register;
 a configuration instruction register connected to the output of said ROM I/O decoder, said register having an array decoder instruction output therefrom;
 a first page pointer latch register connected to said internal data bus and said operation instruction register;
 a second page pointer latch register connected to said first page pointer latch register.
 an adder connected to the most significant bit half of said internal address bus and to said second page pointer latch register;
 as translated address bus connected to said RAM control decoder, to the least significant bit half of said internal address bus and to said adder output, said translated address bus providing an address signal intended to be sent to said plurality of RAM chips;
 a plurality of preconfiguration registers connected to said internal data bus and each having an output connected to said first and said second page pointer latch register;

as RAM share register connected to said internal data bus, said register output being connected to said RAM control decoder and said ROM I/O decoder;

a mode register connected to said internal data bus and to said plurality of preconfiguration registers outputs, said mode register output being connected to said RAM control decoder and said ROM I/O decoder, and having another output for microprocessor selection;

an internal address decoder connected to said internal address bus and to said instruction register, said decoder having an output connected to said mode register and an enable input from said ROM I/O decoder; and a read-write control decoder connected to said operation instruction register and having a read/write gated output for microprocessor control, said read/write control decoder also having an enable input from said ROM I/O decoder.

* * * * *